United States Patent
Dao et al.

(10) Patent No.: US 10,489,114 B2
(45) Date of Patent: Nov. 26, 2019

(54) SHIFT AMOUNT CORRECTION FOR MULTIPLY-ADD

(71) Applicant: International Business Machines Corporation, Armonk, NY (US)

(72) Inventors: Son T. Dao, Stuttgart (DE); Silvia Melitta Mueller, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 14/317,335

(22) Filed: Jun. 27, 2014

(65) Prior Publication Data

US 2015/0378677 A1  Dec. 31, 2015

(51) Int. Cl.
  *G06F 7/483* (2006.01)
  *G06F 5/01* (2006.01)
  *G06F 7/544* (2006.01)

(52) U.S. Cl.
  CPC .......... *G06F 7/483* (2013.01); *G06F 5/01* (2013.01); *G06F 7/5443* (2013.01); *G06F 2207/483* (2013.01)

(58) Field of Classification Search
  CPC .................. G06F 7/4876; G06F 7/5443
  See application file for complete search history.

(56) References Cited

U.S. PATENT DOCUMENTS

| | | | |
|---|---|---|---|
| 5,957,997 A | 9/1999 | Olson et al. | |
| 8,554,819 B2 | 10/2013 | Tajiri | |
| 8,606,840 B2 | 12/2013 | Ahmed | |
| 9,465,575 B2 * | 10/2016 | Iyer | G06F 5/012 |
| 9,542,154 B2 * | 1/2017 | Rubanovich | G06F 7/483 |
| 2002/0124037 A1 * | 9/2002 | Krygowski | G06F 7/49936 708/503 |
| 2004/0122885 A1 * | 6/2004 | Cornea-Hasegan | G06F 7/483 708/495 |
| 2005/0144214 A1 * | 6/2005 | Datta | G06F 5/012 708/523 |
| 2011/0231460 A1 * | 9/2011 | Ahmed | G06F 7/483 708/205 |
| 2012/0079251 A1 * | 3/2012 | Gradstein | G06F 9/30014 712/221 |

(Continued)

OTHER PUBLICATIONS

The Authoritative Dictionary of IEEE Standards Terms, Seventh Edition, Standards Information Network IEEE Press, 2000, p. 444, 476, 1253 (Year: 2000).*

(Continued)

*Primary Examiner* — Andrew Caldwell
*Assistant Examiner* — Emily E Larocque
(74) *Attorney, Agent, or Firm* — Stephen R. Yoder; David B. Woycechowsky

(57) ABSTRACT

Methods and apparatuses for performing a floating point multiply-add operation with alignment correction. A processor receives a first operand, a second operand and a third operand, wherein the first, second and third operands each represent a floating point number comprising a significand value and a biased exponent value. A processor determines a shift amount based, at least in part, on the one or more biased exponent values of the first, second or third operand. A processor determines a shift amount correction based, at least in part, on the one or more biased exponent values of the first, second or third operand being equal to zero.

2 Claims, 4 Drawing Sheets

(56) References Cited

U.S. PATENT DOCUMENTS

2014/0067895 A1* 3/2014 Wang .................... G06F 7/483
708/501
2014/0089371 A1 3/2014 Dupont De Dinechin et al.

OTHER PUBLICATIONS

D. Harris et al., Digital Design and Computer Architecture, Second Edition, Elsevier, 2013, section 5.6. (Year: 2013).*
Akkas et al., "A Decimal Floating-point Fused Multiply-Add Unit with a Novel Decimal Leading-zero Anticipator", pp. 43-50, 978-1-4577-1292-0/11/, copyright 2011 IEEE.
"Shift Amount Correction for Multiply-Add", U.S. Appl. No. 14/572,838, filed Dec. 17, 2014.
Appendix P List of IBM Patents or Patent Applications Treated as Related.

* cited by examiner

SHIFT AMOUNT CORRECTION FOR MULTIPLY-ADD

BACKGROUND OF THE INVENTION

The present invention relates generally to the field of floating point processing, and more particularly to performing a multiply-add operation. In computing, the multiply-add operation is a common instruction that determines the product of two numbers and adds that product to a third number (e.g. D=A×B+C). Some computers may contain dedicated logic to perform a multiply-add operation. Others may perform the operation in software, by determining the values of the operation's components (the product or the sum) separately. The multiply-add operation is a common operation in floating point processors and regularly is used in many areas of computing such as digital signal processing or computer generated imagery. Also the multiply-add operation is a robust instruction that can be used for other calculations such as addition (e.g. D=A×1.0+C) or multiplication (e.g. D=A×B+0.0).

SUMMARY

Embodiments of the present invention provide a method, program product and apparatus to perform a floating point multiply-add operation with alignment correction. A processor receives a first operand, a second operand and a third operand, wherein the first, second and third operands each represent a floating point number comprising a significand value and a biased exponent value. A processor determines a shift amount based, at least in part, on the one or more biased exponent values of the first, second or third operand. A processor determines a shift amount correction based, at least in part, on the one or more biased exponent values of the first, second or third operand being equal to zero.

DETAILED DESCRIPTION

Figure 1:
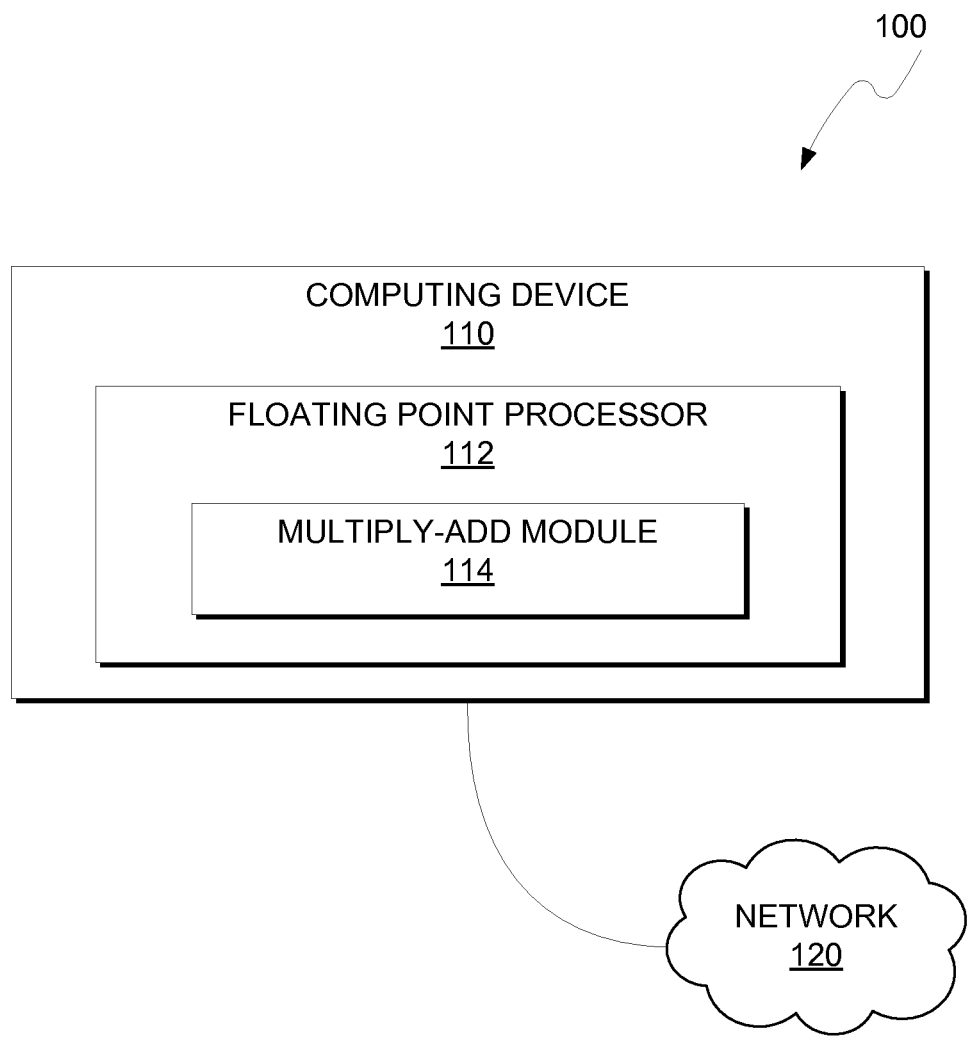
FIG. 1 is a functional block diagram illustrating a computing environment with a floating point unit, in accordance with an exemplary embodiment of the present invention.

Embodiments of the present invention relate to the implementation, either in hardware or software, for performing a multiply-add operation with floating point numbers. Floating point numbers may be represented as normalized or denormalized numbers in a computing system, the distinctions of which are discussed in further detail below. Typically, hardware in a computing system is designed to handle normalized numbers. Some computers handle denormalized numbers in hardware. Others leave the handling of denormalized numbers to system software, only handling normal values in hardware. Handling denormalized numbers in software can lead to a significant decrease in performance. When denormalized numbers are entirely computed in hardware, the speed of computation is significantly reduced on many processors.

Embodiments of the present invention recognize that changes in handling denormalized floating point numbers increase performance. By detecting denormalized numbers and correcting the representation of said numbers, increased performance in performing calculations on the corrected denormalized numbers is gained. Increased performance is gained by treating denormalized not as special cases when computing intermediate results, but as the values in which the denormalized numbers are stored as. When denormalized numbers are present, a correction to the addend of the multiply-add operation resolves the above treatment. Embodiments of the present invention recognize that when denormalized numbers are present in a multiply-add operation, specific handling of an addend in a multiply-add operation can decrease the time required to perform said operation.

A floating point number is a representation of a real number in scientific notation. The representation of a real number as a floating point number may include the following information:

$$(-1)^{sign} * significand * base^{exponent}$$

In the above representation, a sign, significand, base and exponent represent a real number (e.g. 519.42) in a floating point format (e.g. $5.1942 \times 10^2$). The sign represents the direction in a number line the real number is in relation to zero (e.g. positive or negative value). The significand or mantissa represents the significant digits of the real number (e.g. 51942). The base or radix represents the number of unique digits used to represent real numbers (e.g. ten for decimal numbers or two for binary numbers). The exponent or magnitude represents the position of the decimal or radix point in the real number (e.g. an exponent of two moves the radix point two place to the right). Floating point numbers allow for a larger range of values with using fewer digits (e.g. 6,874,000,000 versus $6.874 \times 10^9$), by moving or floating the radix point.

A conventional representation is stored according to the Institute of Electrical and Electronics Engineers (IEEE) 754 standard for floating point number representation. The IEEE 754 standard defines different formats based on the precision the floating point number may represent. The precision of a floating point number, is the finite amount of digits or bits used to represent the floating point number. The foregoing description will discuss the single precision format defined in IEEE 754, however one of ordinary skill in the art will appreciate the description's application to other formats defined by the IEEE 754 standard (e.g. double precision, quadruple precision, etc.).

The IEEE 754 standard comprises three components: a sign bit, an exponent and a significand. For single precision numbers 32 bits are used to represent a floating point number. The series of 32 bits and how they are divided into the three components is illustrated in the table below:

| Component | Sign | Exponent | Significand |
|---|---|---|---|
| Bit Position | 31 | 30 ... ... 23 | 22 ... ... 0 |

In the above table, thirty-two bits are used to represent a floating point number. One bit represents the sign component of a floating point number (i.e. positive or negative). Eight bits represent the exponent component of the floating point number and provides a range of 256 values (0 to 255) the exponent can represent. An offset or bias is associated with the exponent to provide a range of both positive and negative exponents. For example, a bias of 128 may be used to subtract from the bit value to generate a range of 127 to 126, versus the stored 255 to 0. The bias is a predetermined value not stored in the representation and is accounted for in the logic and/or software of a computer. In the above table, 23 bits represent the significand component. The first bit or left most bit of the significand (bit position 0) represents the most significant bit. The last bit or right most bit of the significand (bit position 22) represents the least significant bit. The most significant bit and least significant bit represent an ordering of the significand where the bits starting from the most significant bit have a larger weight associated with the represented value than the following bits.

One aspect of the IEEE 754 single precision standard is that the significand is stored as 23 bits, but represents 24 bits of information. This is true for other precisions, where an additional bit is represented but not stored. When normalized, a significand's most significant bit is assumed and thus removed from the stored representation. For example, a computer may store a representation of binary number, $1.0001 \times 2^1$. In this example, four bits are used to store the significand for the sake of conciseness; the same methodology would apply to larger precision values. It should be noted that in the IEEE 754, standard exponent values are stored with an assumed bias and as an unsigned integer; therefore the actual exponent would be a greater negative value. In the following examples of this disclosure, the bias is not applied to the floating point number when discussing the exponent (e.g. the exponents are written in unbiased formats). Therefore, if a stored exponent's value is "0", then the value the floating point number would be the smallest exponent value that the representation allows. The floating point number's significand would be stored as 0001, with the leading "1" not being stored and assumed to be present in the representation. Assuming two bits for the exponent and one bit for the sign, the floating point number could be stored as 0010001. In this stored string of bits, the first bit is "0" to indicate a positive number, the next two bits being "01" to represent an exponent value of 1, and the last four bits "0001" to represent the significand without the leading bit "1.". As another example, a computer stores a representation of another binary number, $0.0001 \times 2^1$. If the number is stored using the example used above, then the result would be the same "0010001". However, IEEE 754 allows for such numbers with leading zeros to be stored. In such cases, the exponent value is stored as a zero value. As such to store the example $0.0001 \times 2^1$, the computer would store a bit string of "0000001". As such, the significand or mantissa is sometimes referred to as a fraction since only the bits to the right of the radix point are stored and the most significant digit is assumed based on the exponent value. This distinction is key due to the fact that IEEE 754 floating point numbers must be normalized prior to being stored.

Normalization of a floating point number is the technique where a floating point number representation is shifted such that the most significant bit is a one. For example, the number $0.0010001 \times 2^4$ would be normalized until the leftmost bit is a "1". To do so, the floating point number is shifted to the left until the leading bit. For each shift the exponent is decremented by one. In this example, the significand would be shifted three times to the left, resulting in the floating point number $1.0001 \times 2^1$, where the exponent was decremented by three. The floating point number would be stored as a bit string of "0010001", as discussed above, with the leading "1" bit assumed.

Due to the assumption of a leading "1", a true zero (e.g. $0.0 \times 21$) is not valid. However in the IEEE 754 standard various special cases can be represented, such as a true zero being denoted with an exponent field of "0" and a significand field of all zeroes. Another special case exists where if the exponent is equal to "0", but the fraction is non-zero, then the value is referred to as a denormalized number, which does not have an assumed leading "1" before the radix point. Instead the number is assumed to have a leading zero. Such special cases are referred to as denormalized numbers and are used in cases where a normalized number would cause the exponent underflow, yet the remaining significand bits may be used to represent the number. For example, the number $0.0000001 \times 24$ is to be stored. While shifting the significand seven times to have a leading "1", the exponent would underflow to a value of "3". If the exponent becomes negative through an operation, an underflow condition has occurred and thus an exception is raised and must be handled. IEEE 754 allows for cases where normalization may cause the exponent to underflow by allowing for a leading zero, as discussed above. In this example, $0.0000001 \times 24$ causing an underflow exception when shifted left five times (e.g. $0.001 \times 2-1$). A denormalized number is returned by shifting right one bit to result in $0.0001 \times 20$, which is stored as discussed above. Due to the IEEE 754 standard allowing either leading "0" or "1" bits that are not stored in the representation, floating point operations take into consideration cases where the exponent of the representation is equal to zero, indicating a leading zero.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating a computing environment with a floating point unit, generally designated 100, in accordance with one embodiment of the present invention. Computing environment 100 includes computing device 110 connected over network 120. Computing device 110 includes a floating point processor 112. Floating point processor 112 includes multiply-add module 114.

In various embodiments of the present invention, computing device 110 is a computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to floating point processor 112 and is capable of executing multiply-add module 114. Computing device 110 may include internal and external hardware components, as depicted and described in further detail with respect to FIG. 4. In some embodiments, floating point processor 112 is a component of computer processor(s) 404. In other embodiments, floating point processor 112 is a separate component of computing device 110.

In this exemplary embodiment, multiply-add module 114 is stored on floating point processor 112. However, in other embodiments, multiply-add module 114 may be stored externally and accessed through a communication network, such as network 120. Network 120 can be, for example, a local area network (LAN), a telecommunications network, a wide area network (WAN) such as the Internet, or any combination of the three and may include wired, wireless, fiber optic or any other connection known in the art. In general, network 120 can be any combination of connections and protocols that will support communications between computing device 110 and other devices, in accordance with a desired embodiment of the present invention.

In exemplary embodiments, computing device 110 includes floating point processor 112. Floating point processor 112 performs arithmetic and logic operations on floating point numbers. Computing device 110 stores the representation of a floating point number in a binary format. Computing device 110 sends a request to perform an operation to floating point processor. The request may comprise an instruction or operation to perform and one or more operands stored in a floating point representation, such as IEEE 754 single precision. Floating point processor 112 comprises multiply-add module 114. For requests for multiply-add operations, floating point processor 112 sends the operands to multiply-add module 114. Multiply-add module 114 performs a multiply-add operation on three operands A, B and C where the result is equal to A×B+C. Multiply-add module 114 determines a product for the A×B component of the operation, where A is referred to as the multiplicand and B is referred to as a multiplier. Multiply-add module 114 determines a sum for (A×B) and C components of the operation, where the result of the product A×B is the augend of the summation and C is the addend.

In exemplary embodiments, multiply-add module 114 calculates the result of the operation A×B+C, where A, B and C are floating point operands of the calculation. Multiply-add module 114 calculates a product of A×B. Multiply-add module 114 determines a shift amount, SA, based on the value of the exponents of the operands. Multiply-add module 114 aligns the addend, C, with the resulting product of A×B by shifting the addend using the determined shift amount. By shifting the addend to be aligned with the product, the exponents of both the addend and product are equal and can be ignored in the calculation of the sum. The shift amount is determined using the equation below:

$$SA = \exp A + \exp B - \exp C - \text{bias}$$

In the above equation, the exponents of the operands for the product, A and B, are added together while the exponent of the addend, C, is subtracted from the result. For embodiments where a bias is associated with the floating point representation of the exponent, the bias is also subtracted from the result to account for the offset the bias introduces. It should be noted that the above equation does not take into consideration if the stored floating point numbers have zero exponents. As discussed above with regards to the IEEE 754 standard, a zero exponent is a special case where the floating point number has a leading "0" left of the radix point which is not stored in the significand. Multiply-add module 114 determines SA using the exponent values as stored in the operands, not the exponents that the floating point number represents. For example, a zero in the exponent of a floating point number representation is a special case where the leading bit left of the radix point is a "0". However in such a case, the exponent of the floating point number representation corresponds to is equal to one. That is to say if an exponent is equal to zero, it indicates a special case where the leading bit is a zero and the exponent is equal to one for the number being represented. So if a stored fraction is "0001" and the exponent is "0", then the number being represented is $0.0001 \times 2^1$. As such, an exponent of "0" is stored to represent a denormalized number; however an exponent of "1" is the value that is represented. In exemplary embodiments, multiply-add module 114 does not correct the stored value of the exponent to the represented value of the exponent. Multiply-add module 114 performs the multiplication and subsequent addition operation by not correcting a denormalized number when such a special case occurs. Multiply-add module 114 accounts for such treatment of denormalized numbers by calculating a shift correction amount.

Multiply-add module 114 determines a shift amount (SA) correction to account for using any special cases where a zero exponent is stored in an operand. Multiply-add module 114 uses a look-up table or logic to determine a SA correction. An example of the look-up table, Table 1, is shown below:

TABLE 1

| expA = 0 | expB = 0 | expC = 0 | SA Correction |
|---|---|---|---|
| False | False | False | 0 |
| False | False | True | −1 |
| False | True | False | +1 |
| False | True | True | 0 |
| True | False | False | +1 |
| True | False | True | 0 |
| True | True | False | +2 (not used) |
| True | True | True | +1 (not used) |

In the above Table 1, multiply-add module 114 determines a SA correction based on the exponents of the operands being equal to zero. Multiply-add module 114 performs a shifting operation based on the determined SA correction amount. For SA corrections equal to zero, multiply-add module 114 does not perform any correction. For example, if no operand has a zero exponent then no correction is necessary. For SA corrections with a negative SA correction, multiply-add module 114 shifts the addend to the left by the SA correction amount in addition to the determined shift amount. For SA corrections with a positive SA correction, multiply-add module 114 shifts the addend to the right by the SA correction amount in addition to the determined shift amount. In this embodiment, if the exponents of the operands for the product are equal to zero (i.e. expA=0 and expB=0), then multiply-add module may not perform a SA correction. The resulting product of two denormalized numbers (e.g. 0.004×0.002=0.000008) creates leading zeroes which will not impact the resulting addition since B<<A×B. Therefore, multiply-add module 114 may not perform the SA correction as determined to save additional processing. In other embodiments, multiply-add module 114 determines a SA correction when the operands of the product have exponents equal to zero, as shown in the last two rows of Table 1.

In exemplary embodiments, multiply-add module 114 aligns the addend C to the product of A×B, such that the exponents of the product and addend are equal. Multiply-add module 114 aligns the addend by the determined SA. Multiply-add module 114 corrects the aligned addend using the determined SA correction. Both the determination of the SA amount and the SA correction may be done in parallel. In other embodiments, multiply-add module 114 may offset the SA by the SA correction prior to alignment. In such embodiments, a total shift amount is determined. The total alignment is equal to the SA amount added with the SA correction.

Multiply-add module 114 adds the significands of the product and addend. Multiply-add module 114 normalizes the result of the sum. Multiply-add module 114 rounds the normalized result's significand to the precision of the floating point number representation used (e.g. for IEEE 754 single precision the result would be rounded to 24 bits and the leading "0" or "1" would be removed). Multiply-add module 114 returns the result to floating point processor 112.

In exemplary embodiments, multiply-add module 114 performs a fused multiply-add operation using three operands A, B and C. A fused multiply-add operation is performed where rounding occurs once the operation is completed. Multiply-add module 114 maintains a larger significand for the intermediate product and sum generated in the multiply-add operation. Once the operation is complete, the final result is rounded to a predetermined precision (e.g. the precision of the operands). In other embodiments, an unfused multiply-add operation performs two steps of rounding once after the determination of the product and another after the determination of the sum. As such, and unfused multiply-add rounds the intermediate calculations after being determined. An unfused multiply-add may be implemented using separate modules (e.g. where the product is determined using a multiplication module and the result sent to an addition module).

Figure 2:
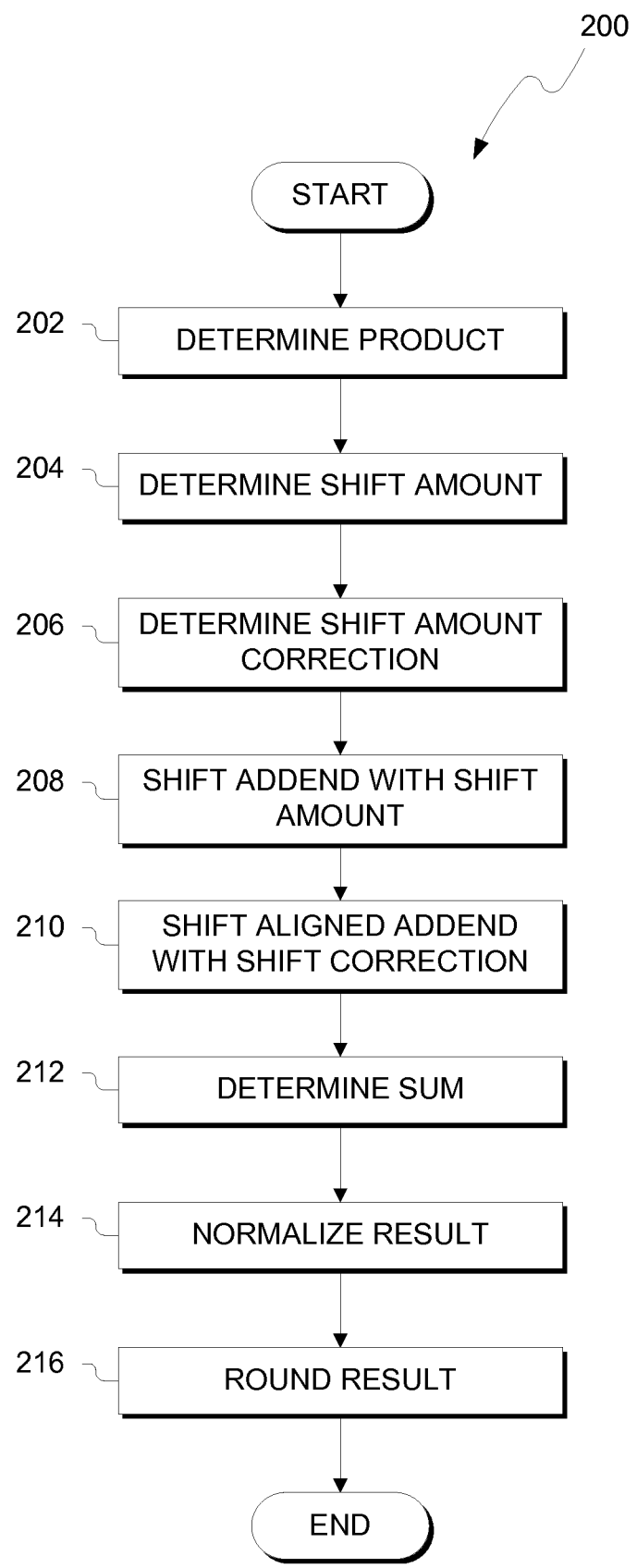
FIG. 2 illustrates operational processes of generating a resultant of a multiply-add operation with shift correction, on a computing device within the environment of FIG. 1, in accordance with an exemplary embodiment of the present invention.

FIG. 2 illustrates operational processes, 200, of generating a resultant of a multiply-add operation with shift correction, on a computing device within the environment of FIG. 1, in accordance with an exemplary embodiment of the present invention.

In process 202, multiply-add module 114 determines a product by multiplying A and B. Multiply-add module 114 multiplies the significands of the floating point numbers A and B to determine the product's significand. Multiply-add module 114 will add the exponents of operands A and B to determine the product's exponent. In exemplary embodiments, multiply-add module 114 handles normalized and denormalized floating point numbers in a similar manner. Multiply-add module 114 does not alter the significand of denormalized numbers and uses the stored exponent value (i.e. "0") as opposed to the exponent value the denormalized numbers represent (i.e. "1"). In embodiments where multiply-add module 114 performs a fused multiply-add operation, multiply-add module 114 will determine a product's significand with twice the number of bits as the significand of the operands. Multiply-add module 114 will maintain the additional precision until the round process 216. In embodiments where multiply-add module 114 performs an unfused multiply-add operation, the determined product is rounded to the precision of the significand of the operands.

In process 204, multiply-add module 114 determines a shift amount to align the addend, C, to the product determined in process 202. Multiply-add module 114 determines the shift amount (SA) using the following equation, SA=expA+exp B−expC−bias. Multiply-add module 114 does not account for the special case of denormalized numbers where the exponent of an operand is equal to zero. Multiply-add module 114 uses the exponents as stored in operands A, B and C.

In process 206, multiply-add module 114 determines a shift amount correction to account for instances where an exponent of one or more of the operands is equal to zero. Using the table discussed above describing the shift amount correction, multiply-add module 114 determines a shift amount correction based on one or more exponents of the operands A, B or C being equal to zero. In exemplary embodiments, multiply-add module 114 may perform processes 202, 204 and 206 in parallel or separately due to each process requiring information of the operands (e.g. the operands significands and exponents) and not requiring any intermediate determination of said processes (e.g. the product, shift amount or shift amount correction).

In process 208, multiply-add module 114 aligns the addend, C, by shifting the addend based on the determined shift amount. For example, for positive shift amounts multiply-add module 114 performs a bitwise shift right on the addend's significand based on the value of the shift amount. Multiply-add module 114 increments the addend's exponent by the same shift amount. As another example, for negative shift amount multiply-add module 114 performs a bitwise shift left on the addend's significand based on the value of the shift amount. Multiply-add module 114 decrements the addend's exponent by the same shift amount.

In process 210, multiply-add module 114 shifts the aligned addend determined in process 208 by the determined shift amount correction determined in process 206 to generate a corrected addend. Since the shift amount determination in process 204 does not correct operands for special cases where the floating point number is denormalized (e.g. the exponent is equal to zero and therefore the leading bit is a 0), multiply-add module 114 determines if any such special cases are present in the requested multiply-add operation's operands. Based on the shift amount correction table discussed above, multiply-add module 114 determines a shift correction amount (process 206). Multiply-add module 114 shifts the aligned addend based on the determined shift correction amount. In exemplary embodiments, the additional alignment determined in process 206 is applied before or after the shift amount determined in process 204. This is due to the smaller shift amount that the shift amount correction applies (e.g. −1, 0 or +1) and the smaller amount of processing power that a small alignment operation requires. Also by applying the shift amount correction alignment in process 210 separately from the shift alignment in process 208, the processes of determining the product (process 202), shift amount (process 204) and shift amount correction (process 206) can be performed in parallel without impacting dataflow. In other embodiments, the shift amount and shift amount correction may be combined (e.g. by performing a summation of the shift amount and shift amount correction) and performed in one alignment process.

In process 212, multiply-add module 114 determines a sum of the corrected addend (process 210), with the determined shift amount (process 204) and shift amount correction (process 206) applied, and the product (process 202). Based on the shift amount alignment and shift amount correction alignment determined in processes 204 and 206, respectively, and applied in processes 208 and 210, respectively, the corrected addend's exponent will be equal to the product's exponent. Multiply-add module 114 adds the significands of the corrected addend and the product to determine the sum of the significands and the exponent of the result will remain the same as the operands, due to the alignment processes performed. In exemplary embodiments, multiply-add module 114 handles normalized and denormalized floating point numbers in a similar manner. Multiply-add module 114 does not alter the significand of denormalized numbers and uses the stored exponent value (i.e. "0") as opposed to the exponent value the denormalized numbers represent (i.e. "1"). The shift correction determined in process 206 and performed in process 210 corrects the similar handling of denormalized and normalized numbers.

In process 214, multiply-add module 114 normalizes the result such that any leading zeros are removed without causing exponent underflow. If exponent underflow occurs, then multiply-add module 114 returns a denormalized exponent.

In process 216, multiply-add module 114 rounds the normalized result to fit the precision of the floating point number representation stored in computing device 110. In a fused multiply-add operation, multiply-add module 114 may maintain a larger precision significand during the above processes 202-214. Multiply-add module 114 determines a rounded result based on a given rounding method and returns the rounded result as a result of the multiply-add operation.

Figure 3:
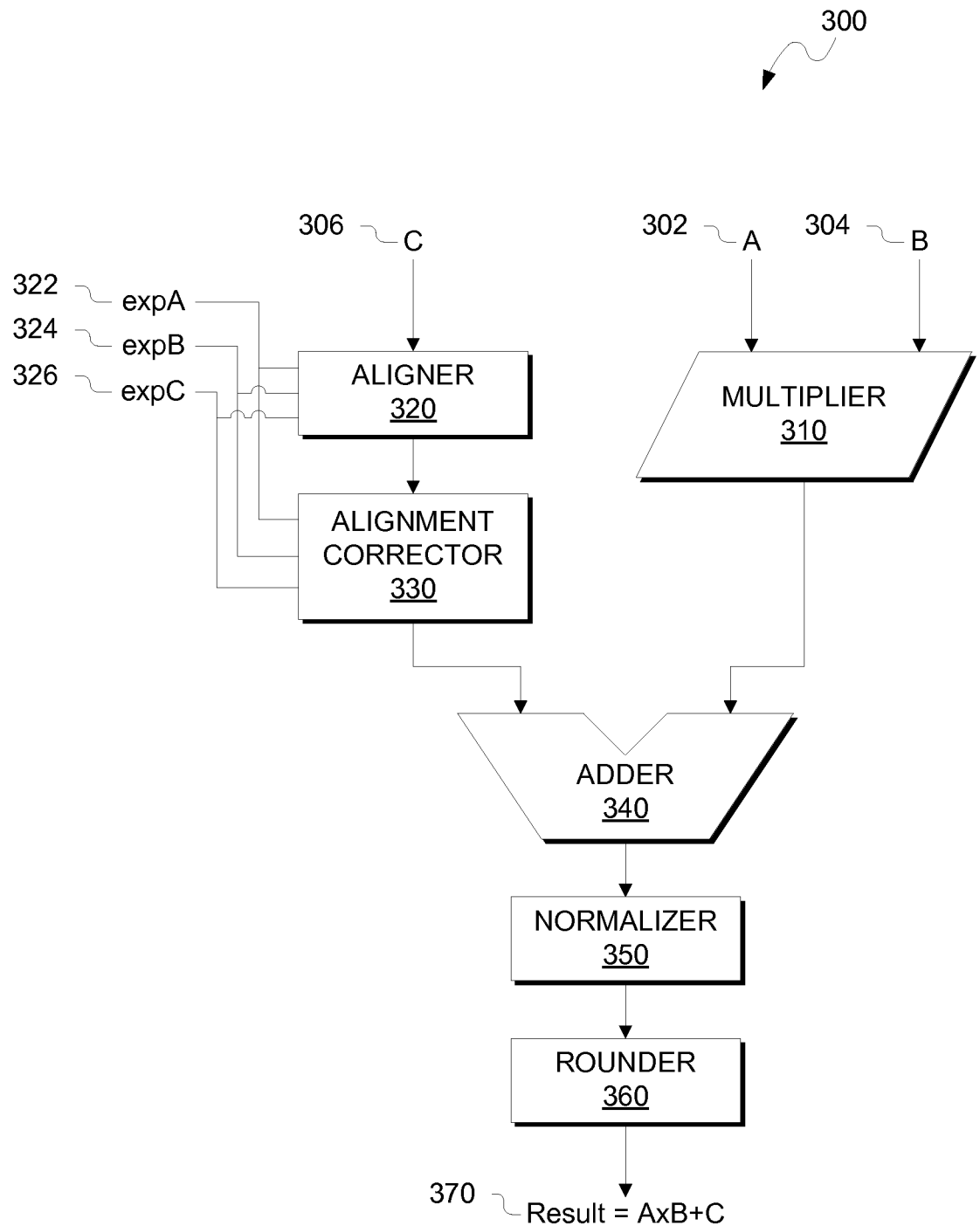
FIG. 3 illustrates example block diagram of a multiply-add module, in accordance with an exemplary embodiment of the present invention.

FIG. 3 illustrates example logical block diagram 300 of a multiply-add module, in accordance with an exemplary embodiment of the present invention.

Multiply-add module 114 receives operands A 302, B 304 and C 306, where multiply-add module 114 determines the result of the operation A×B+C. Operands A 302, B 304 and C 306 comprise bits representing the sign, significand and exponent values for the respective operands. Operands A 302, B 304 and C 306 are represented by a floating point number representation that allows for denormalized numbers (e.g. IEEE 754). Multiplier 310 comprises a multiplier block. Multiplier 310 determines the product of operands A 302 and B 304 including the resulting sign, significand and exponent values of the product. In exemplary embodiments, multiplier 310 handles normalized and denormalized floating point numbers in a similar manner. Multiplier 310 does not alter the significand of denormalized numbers and uses the stored exponent value (i.e. "0") as opposed to the exponent value the denormalized numbers represent (i.e. "1"). In some embodiments, the product comprises additional bit of the significand to maintain the precision of the multiplication calculation.

In parallel to the logic of multiplier 310, aligner 320 shifts the addend operand, C 306, based on the shift amount calculation (i.e. SA=expA+expB−expC−bias). Aligner 320 bases the calculation on the exponent values 322, 324 and 326 of the operands 302-306. The bias is set based on the floating number representation the operands 302-306 are stored as (e.g. for single precision format with eight bit wide exponent, the bias is 128). In some embodiments, dataflow of multiply-add module 114 may provide the exponent as separate registers. In other embodiments, the dataflow of multiply-add module 114 passes along the operands 302-306 to the logic blocks comprising the module. It should be noted in both cases aligner 320 performs the alignment of the addend while processing of multiplier 310 occurs. As stated above, aligner 320 does reformat the special case where an operand's exponent 322-326 is equal to zero (e.g. the operand is denormalized). The correction is performed by alignment corrector 330.

Alignment corrector 330 contains logic to determine a correction to the result of aligner 320. The logic may either be implemented as a look up table, logic gates or any other known logic to perform the equivalent operation of the look up discussed above. Alignment corrector 330 determines a shift amount correction based on the exponents 322-326 of the operands 302-306. In exemplary embodiments, alignment corrector 330 determines the shift amount correction in parallel to the shift amount determination by aligner 320 and the determination of the product by multiplier 310. Once aligner 320 has shifted the addend by the shift amount, alignment corrector 330 corrects the shifted addend by the shift amount correction.

Adder 340 determines the sum of the significands for the product determined by multiplier 310 and the shift corrected addend determined by alignment corrector 330. The sum determined by the adder is normalized by normalizer 350. Normalizer 350 detects any leading zeros and shifts the sum of the addend and the product. Rounder 360 rounds the normalized sum to a precision of the floating point number representation to produce the final result 370 of the multiply-add operation. In exemplary embodiments, adder 340 handles normalized and denormalized floating point numbers in a similar manner. Adder 340 does not alter the significand of denormalized numbers and uses the stored exponent value (i.e. "0") as opposed to the exponent value the denormalized numbers represent (i.e. "1"). The shift correction determined and performed by alignment corrector 330 corrects the similar handling of denormalized and normalized numbers.

Figure 4:
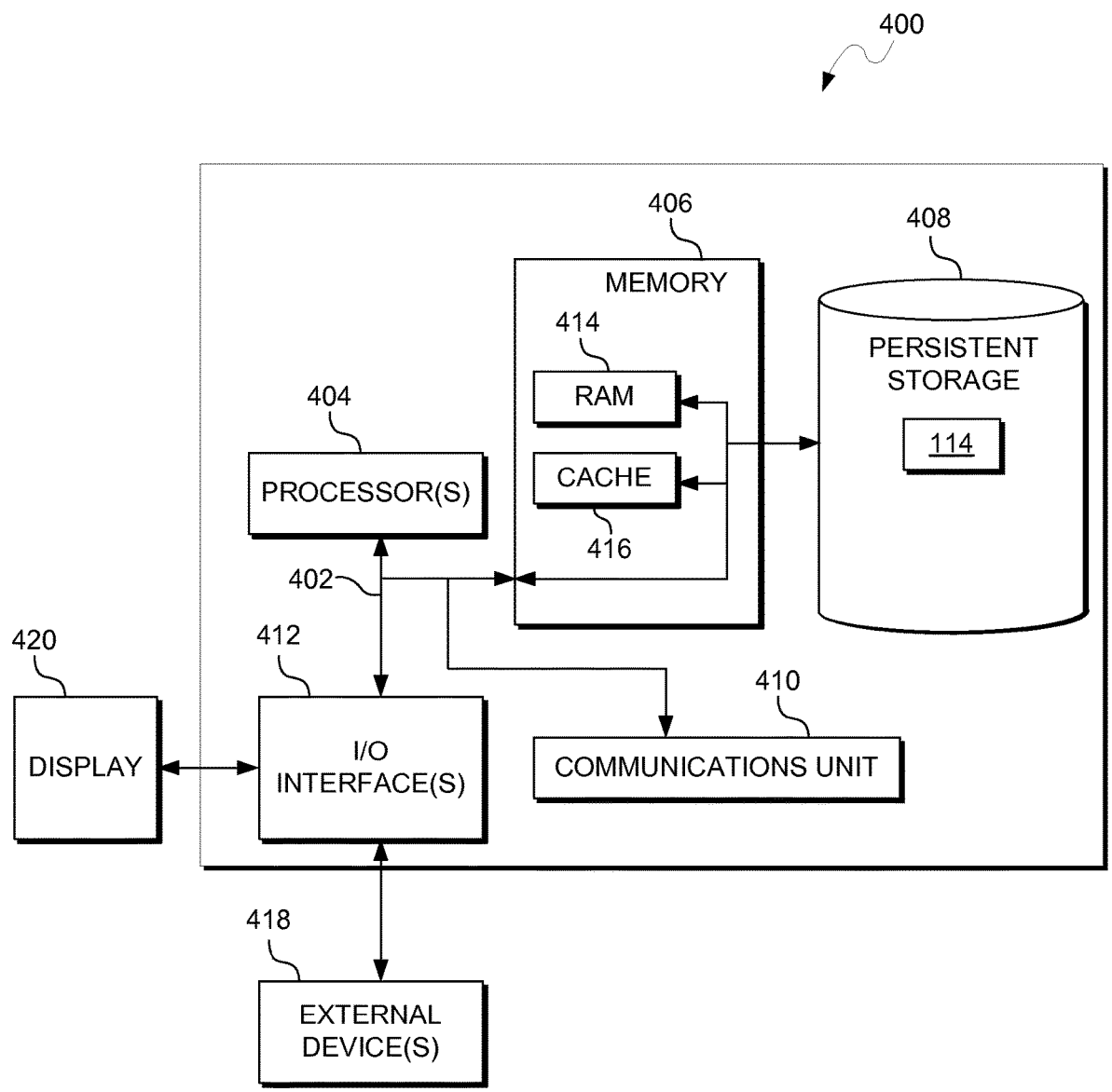
FIG. 4 depicts a block diagram of components of the computing device executing the method of FIG. 2, in accordance with an exemplary embodiment of the present invention.

FIG. 4 depicts a block diagram, 400, of components of computing device 110, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

In some embodiments, multiply-add module 114 may be stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information. In other embodiments, floating point processor 112 and multiply-add module 114 may be, respectively, implemented as modules of computing device 110 or processor(s) 404. For example, a module or similar unit of functionality may be implemented as a hardware circuit comprising custom VLSI circuits or gate arrays, off-the-shelf semiconductors such as logic chips, transistors, or other discrete components. A module may also be implemented with programmable hardware devices such as field programmable gate arrays, programmable array logic, programmable logic devices or the like. A module or a set of modules may also be implemented (in whole or in part) as a processor configured with software to perform the specified functionality. An identified module may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. A module may also be embodied as a server with a service executing thereon.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 120. In these examples, communications unit 410 includes one or more network interface cards. Communications unit 410 may provide communications through the use of either or both physical and wireless communications links. Multiply-add module 114 may be, respectively, downloaded to persistent storage 408 through communications unit 410.

I/O interface(s) 412 allows for input and output of data with other devices that may be connected to computing device 110. For example, I/O interface 412 may provide a connection to external devices 418 such as a keyboard, a keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., multiply-add module 114 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist. Some methods according to the present invention may include one, or more, of the following features, characteristics, advantages and/or operations: (i) a method of performing a floating point multiply-add operation with alignment correction; (ii) receiving, by one or more processors, a first operand, a second operand and a third operand, wherein the first, second and third operands each represent a floating point number comprising a significand value and a biased exponent value; (iii) determining, by the one or more processors, a shift amount based, at least in part, on the one or more biased exponent values of the first, second or third operand; (iv) determining, by the one or more processors, a shift amount correction based, at least in part, on at least one of the biased exponent values of the first, second or third operand being equal to zero; (v) the biased exponent value being equal to zero indicates a denormalized floating point number; (vi) the determined shift amount is not altered based, at least in part, on at least one of the first, second or third operands determined to be a denormalized floating point number; (vii) determining, by the one or more processors, a product of the first operand and the second operand; (viii) shifting, by the one or more processors, the third operand based, at least in part, on the shift amount; (ix) shifting, by the one or more processors, the third operand based, at least in part, on the shift amount correction; (x) determining, by the one or more processors, a sum of the product and the shifted third operand; (xi) the product is determined without changing the biased exponent value of the first or second operands in response to the respective first or second operand having a biased exponent equal to zero; (xii) determining, by the one or more processors, the biased exponent values of the first and second operands are both equal to zero; and/or (xiii) shifting the third operand based, at least in part, on the shift amount correction is not performed in response to both the biased exponent values of the first and second operands being equal to zero.

What is claimed is:

1. A floating point processor chip (FPPC) comprising:
denormalizing number handling hardware (DNHH) structured and/or programmed to perform operations including the following:
receiving, by the denormalizing number handling hardware (DNHH) of the floating point processor chip (FPPC) that handles denormalized numbers in hardware, a first operand, a second operand and a third operand, with: (i) the first, second and third operands each respectively representing a floating point number, (ii) the first, second and third operands each respectively including a significand value and a biased exponent value, (iii) the first and second operands representing values to be multiplied as a first stage of a multiply-add operation to form an intermediate product value, and (iv) with the third operand representing a value to be added to the intermediate product in a second stage of the multiply-add operation to form a final result value,
determining, by the DNHH, a shift amount based on the biased exponent values of the first, second and third operands,
multiplying, by a first multiplier of the DNHH, a product of the first operand and the second operand, as a first stage of the multiply-add operation to obtain the intermediate product, with the multiplication being performed without changing the biased exponent value of the first or second operands,
determining, by the DNHH, a raw shift amount value by subtracting a bias value and the biased exponent value of the third operand from a sum of the biased exponent values of the first and second operands,
determining, by the DNHH, that the biased exponent value of the first operand is not equal to zero,
determining, by the DNHH, that the biased exponent value of the second operand is not equal to zero,
determining, by the DNHH, that the biased exponent value of the third operand is equal to zero,
responsive to the determination that the biased exponent value of the first operand is not equal to zero, further responsive to the determination that the biased exponent value of the second operand is not equal to zero, and further to the determination that the biased exponent value of the third operand is equal to zero, determining, by a first alignment corrector of the DNHH, a corrected shift amount by subtracting one from the raw shift amount,
shifting, by a first aligner of the DNHH, the third operand based by the corrected shift amount to obtain a shifted third operand, and summing, by a first adder of the DNHH, the intermediate product and the shifted third operand to obtain the final result of the multiply add operation.

2. The FPPC of claim 1 wherein the floating point number representation conforms to the Institute of Electrical and Electronics Engineers (IEEE) 754 standard.

* * * * *